United States Patent

Gerken et al.

[11] Patent Number: 5,986,360
[45] Date of Patent: Nov. 16, 1999

[54] DEVICE AND METHOD FOR CONTROLLING AT LEAST ONE CAPACITIVE ACTUATOR

[75] Inventors: Hartmut Gerken, Nittendorf; Christian Hoffmann, Regensburg; Hellmut Freudenberg, Grossberg; Richard Pirkl, Regensburg; Martin Hecker, Laimerstadt, all of Germany

[73] Assignee: Siemens Aktiengesellschaft, Munich, Germany

[21] Appl. No.: 09/133,764

[22] Filed: Aug. 12, 1998

[30] Foreign Application Priority Data

Aug. 12, 1997 [DE] Germany ............ 197 34 895

[51] Int. Cl.$^6$ ................................................. H01H 47/00
[52] U.S. Cl. ................... 307/125; 307/130; 123/478; 123/498; 310/316
[58] Field of Search ........................ 307/125, 130, 307/143; 123/478, 498; 310/316, 318, 319; 323/287

[56] References Cited

U.S. PATENT DOCUMENTS

| | | | |
|---|---|---|---|
| 4,688,536 | 8/1987 | Mitsuyasu et al. | 123/490 |
| 4,947,074 | 8/1990 | Suzuki | 310/316 |
| 4,966,119 | 10/1990 | Mitsuyasu et al. | 123/498 |
| 5,053,668 | 10/1991 | Mitsuyasu | 310/317 |
| 5,057,734 | 10/1991 | Tsuzuki et al. | 310/317 |
| 5,130,598 | 7/1992 | Verheyen et al. | 310/316 |
| 5,543,679 | 8/1996 | Morino et al. | 310/316 |

FOREIGN PATENT DOCUMENTS 36 21 541 C2  1/1989  Germany .

OTHER PUBLICATIONS

Patent Abstracts of Japan No. 3–199650 A (Mitsuyasu), dated Aug. 30, 1991.

*Primary Examiner*—Fritz Fleming
*Assistant Examiner*—Peter Zura
*Attorney, Agent, or Firm*—Herbert L. Lerner; Laurence A. Greenberg

[57] ABSTRACT

One or more capacitive actuators are controlled by a device that charges the actuators via a capacitor and from a switched mode power supply SMPS that operates according to the flyback converter principle. The secondary coil of the switched mode power supply functions as the charging coil and the discharging coil, i.e., it simultaneously undertakes the function of the large, heavy charging coil. This saves space and weight.

8 Claims, 2 Drawing Sheets

DEVICE AND METHOD FOR CONTROLLING AT LEAST ONE CAPACITIVE ACTUATOR

BACKGROUND OF THE INVENTION

Field of the Invention

The invention relates to a device for controlling (driving) capacitive actuators. The invention pertains in particular to the control of fuel injection valves of an internal combustion engine by means of signals fed to a control circuit. The system includes a configuration for producing a high voltage from a DC voltage source, a capacitor, a charging coil, a discharging coil, and at least one charging switch and one discharging switch. The invention also relates to a method for operating the device.

Japanese patent abstract JP 3-199650 A (Patent Abstracts of Japan M-1183, 25 Nov. 1991, vol. 15, No. 463) discloses a circuit for driving a capacitive actuator by means of a control circuit, which has a voltage source for producing a high voltage, a capacitor, a charging coil, a discharging coil as well as a charging switch and a discharging switch. If, as a result of spurious signals, the charging switch and the discharging switch are turned on at the same time, the circuit is isolated from the voltage source.

German published non-prosecuted patent application DE 36 21 541 A1 discloses a device for driving capacitive actuators. The device includes a capacitor that can be charged from a voltage source, a charging coil and a discharging coil. A voltage $U_P$ which can be achieved at the capacitive actuators is limited to a value $U_P<2U_B$ less than two times the output voltage $U_B$ of the voltage source.

That circuit is not suitable for a high voltage supply to capacitive actuators for fuel injection valves of a motor vehicle internal combustion engine, with $U_B \approx 15 U_B$. Higher voltages can be produced in known fashion by means of switched mode power supplies (SMPS).

Because of the dimensions of the coils of the switched mode power supply SMPS (transformer), of the charging coil and of the discharging coil, as well as their weight, problems result when they are placed into a housing specific to a motor vehicle.

SUMMARY OF THE INVENTION

It is accordingly an object of the invention to provide a device and method for driving capacitive actuators, which overcomes the above-mentioned disadvantages of the heretofore-known devices and methods of this general type and the dimensions and weight of which are reduced such that it fits straightforwardly into a motor vehicle-specific housing. A further object of the invention is to provide a method for operating the novel device.

With the foregoing and other objects in view there is provided, in accordance with the invention, a device for driving a capacitive actuator with a first terminal and a second terminal, comprising:

a switched mode power supply for producing a high voltage from a DC voltage source having a positive pole and a negative pole, the power supply containing a transformer with a primary coil and a secondary coil;

an electronic switch connected in series with the primary coil of the transformer between the positive pole and the negative pole of the DC voltage source;

a capacitor connected between a first terminal of the secondary coil of the transformer and the negative pole of the voltage source, and the secondary coil having a second terminal connected to the first terminal of the actuator;

a charging switch connected between the second terminal of the actuator and the negative pole and conducting only in a direction towards the negative pole;

a discharging switch connected in parallel with the charging switch, the discharging switch conducting in a direction away from the negative pole;

a series circuit consisting of a commutating coil and a commutating switch connected between the second terminal of the secondary coil and the negative pole, the commutating switch conducting in the direction towards the negative pole; and a diode conducting in the direction away from the negative pole connected in parallel with the series circuit.

The secondary coil of the transformer, therefore, functions as a charging coil and a discharging coil.

In accordance with an added feature of the invention, the capacitive actuator is one of a plurality of actuators connected in parallel to the second terminal of the secondary coil. In a preferred embodiment, the actuators each control a fuel injection valve of ain internal combustion engine.

In accordance with an additional feature of the invention, the charging switch is a PMOS transistor.

In accordance with another feature of the invention, there is provided a control circuit for driving the capacitive actuator in accordance with signals received thereby, the control circuit being connected to and driving the electronic switch, the charging switch, the discharging switch, and the commutating switch.

With the above and other objects in view there is also provided, in accordance with the invention, a method of operating the device. The method comprises the following steps:

driving the electronic switch, the commutating switch, the charging switch, and the discharging switch with the control circuit in dependence on control signals, on a voltage of the capacitor, and on an actuator voltage, and thereby:

charging the capacitor by switching the electronic switch until a capacitor voltage of the capacitor reaches a predetermined setpoint value;

feeding a control signal to the control circuit for driving the actuator, whereupon the control circuit triggers the charging switch for charging the actuator from the capacitor via the secondary coil, until an actuator voltage has reached a predetermined setpoint value;

triggering the commutating switch when the setpoint valve has been reached, for turning the charging switch off, whereby the actuator remains charged and the capacitor is negatively biased, whereupon the commutating switch is turned off; and discharging the actuator at an end of the control signal by triggering the discharging switch, and discharging the actuator via the secondary coil into the capacitor.

In accordance with a concomitant feature of the invention, where several actuators are driven with the device, the driving step comprises operating the control circuit in dependence on a number of the actuator to be driven.

Through coupling of the switched mode power supply to the output state of the circuit, the function of the charging and discharging coils is uiiderttaken by the secondary coil of the switched mode power supply transformer. The large, heavy charging coil (or discharging coil) can thereby be eliminated and the place-saving object is satisfied.

Other features which are considered as characteristic for the invention are set forth in the appended claims.

Although the invention is illustrated and described herein as embodied in a device and method for driving at least one capacitive actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
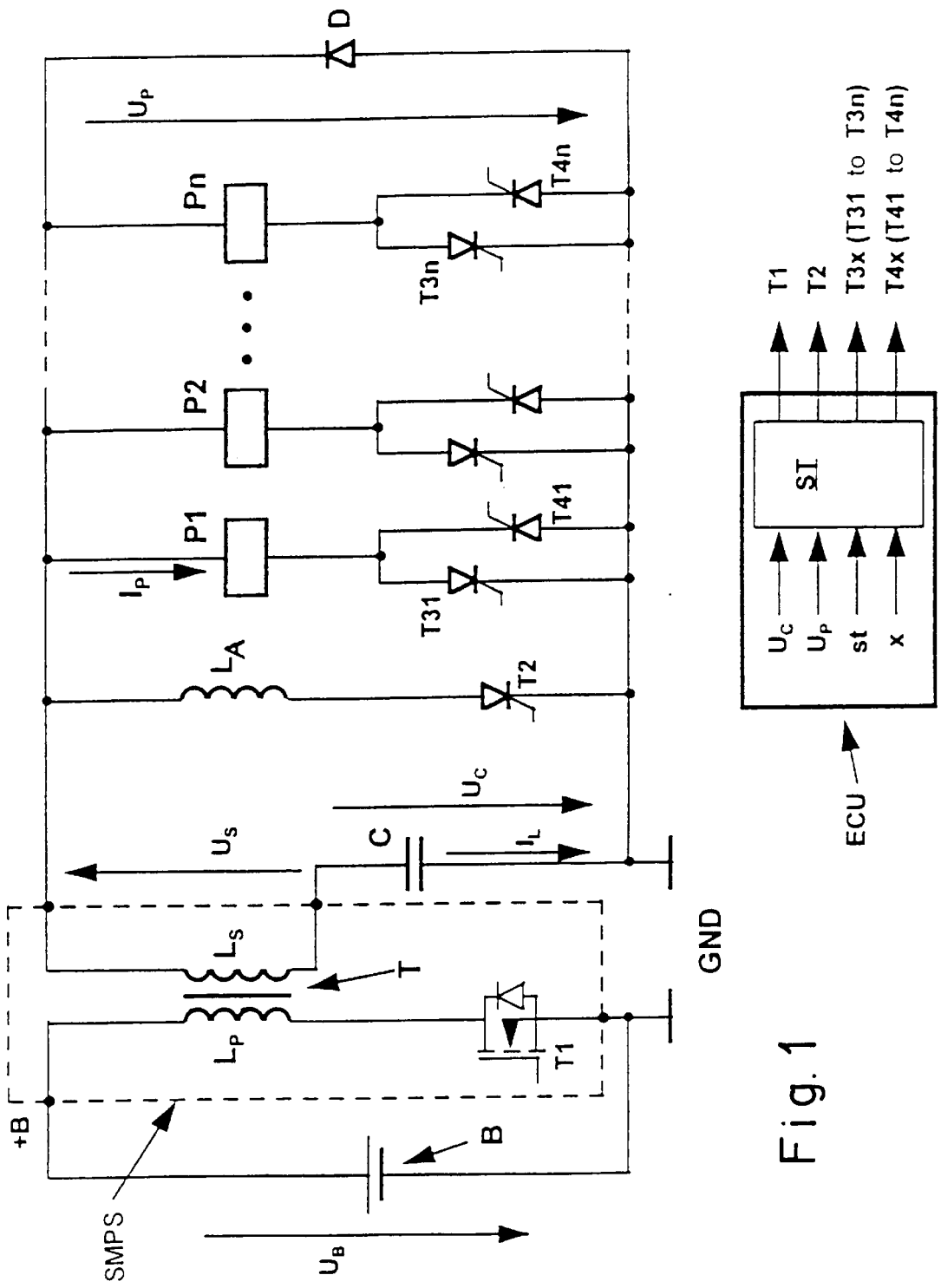
FIG. 1 is a circuit diagram of an exemplary embodiment.

Referring now to the figures of the drawing in detail and first, particularly, to FIG. 1 thereof, there is seen a circuit for driving the fuel injection valves of a motor vehicle internal combustion engine. The valves and the internal combustion engine are not illustrated for purposes of clarity. The valves are driven via capacitive (piezoceramic) actuators Px (x=1 to n) with signals from a control circuit ST, which forms part of a microprocessor-controlled engine control unit ECU.

A series circuit consisting of the primary coil $L_P$ of a transformer T and an electronic switch T1, preferably a PMOS transistor, which is driven by the control circuit ST, is connected to the terminals +B and GND of an in-vehicle voltage source B, which delivers a battery voltage of for example 12 V. The transformer T and the charging switch T1 form part of a switched mode power supply SMPS that is indicated by a dashed box. The switched mode power supply SMPS operates according to the flyback converter principle.

The secondary coil $L_S$ of the transformer T is connected by its first terminal via a capacitor C to the negative pole GND of the voltage source B, and by its second terminal to a respective terminal of the capacitive actuators Px that are connected in parallel. Each of the other terminals of the capacitive actuators Px (P1 to Pn) is connected to the negative pole GND of the voltage source B via two electronic switches T3x and T4x, each conducting in only one direction. The one switch T3x is used as a charging switch and it can be turned on so as to conduct from the respective actuator Px to the negative pole GND. The respective other switch T4x is used as a discharging switch and it can be turned on so as to conduct from the negative pole GND to the respective actuator Px.

A series circuit consisting of a commutating coil $L_A$ and an electronic commutating switch T2 that can be turned on so as to conduct toward the negative pole GND is connected between the second terminal of the secondary coil $L_S$ and the negative pole GND, and a diode D which conducts in the direction from the negative pole GND to the second terminal of the secondary coil $L_S$ is arranged in parallel with this series circuit.

Preferably, the commutating switch T2, the charging switch T3x and the discharging switch T4x are thyristor switches which are automatically turned off when the current crosses zero (when the current flowing through them changes sign).

A method for operating the described drive circuit will be described below with the aid of the drawing:

Starting from a steady state, in which all the switches T1, T2, T3x and T4x are off, the transformer T is unpowered, the capacitive actuators Px (P1 to Pn) are discharged and the capacitor C is about half charged, the charging switch T1 is switched according to the flyback converter principle in order to charge the capacitor C (T1=1; I in FIG. 2).

A charging current $I_L$ (FIG. 1) flows from the secondary coil $L_S$ through the capacitor C and the diode D back to the secondary coil $L_S$.

Figure 2:
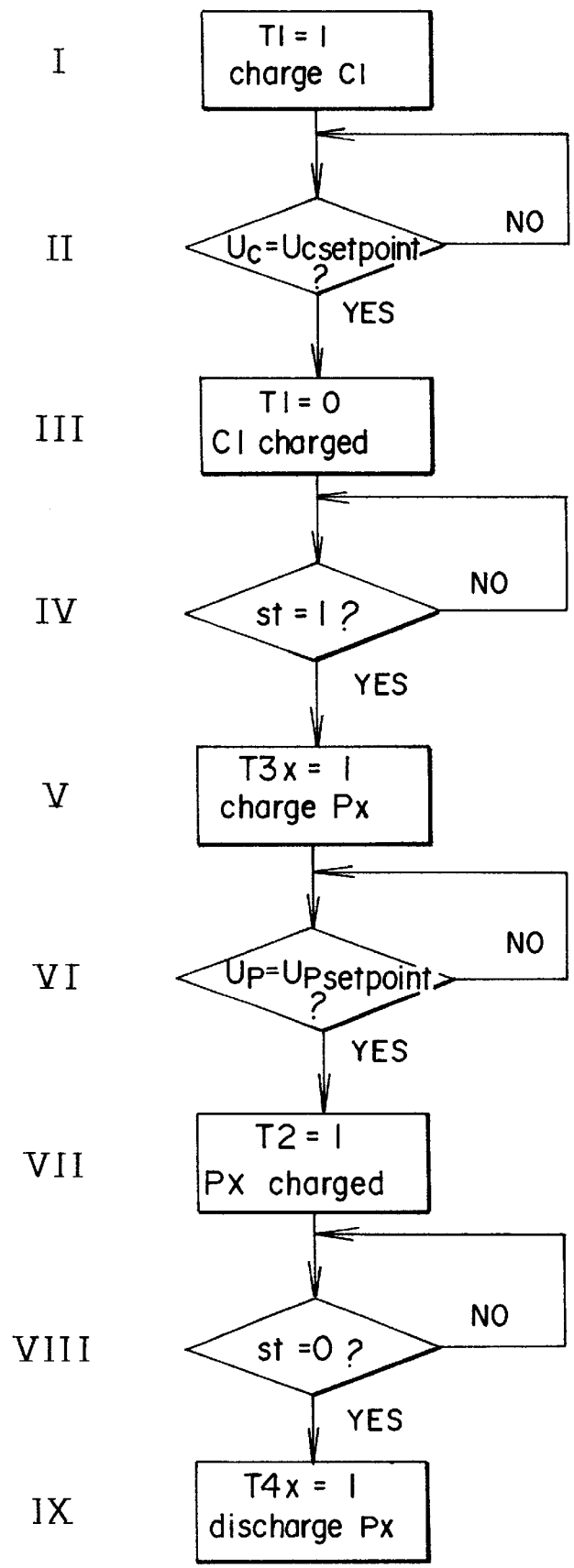
FIG. 2 is a flow chart relating to the sequence in the drive method according to the invention.

Once the capacitor voltage $U_C$ has reached a predetermined target or setpoint value $U_{Csetpoint}$ (FIG. 2, II), charging switch T1 is deactivated (FIG. 2; III). The capacitor C is therefore, for example, charged to a voltage $U_{Csetpoint}$.

In order to charge a capacitor C which is fully discharged (after a fairly long idle period), the charging switch T1 must necessarily be switched for a longer time, in order to change the capacitor C to the setpoint value $U_{Csetpoint}$.

If, for example, the actuator P1 is then to be driven, for which purpose a control signal st (st=1; FIG. 2, IV) is fed to the control circuit ST, then the charging switch T31 is triggered (FIG. 2; V. A charging current $I_P$ then flows from the capacitor C, serving as a voltage source, via the secondary coil $L_S$, currently working as a charging coil, into the actuator P1. From there it flows back to the capacitor C via the charging switch T31, which is on. The fuel injection valve is opened.

As soon as the actuator voltage $U_P$ has reached a predetermined target or setpoint value $U_{Psetpoint}$, the commutating switch T2 is triggered (FIG. 2; VI). This immediately turns the charging switch T31 off (the thyristor de-energizes and enters the off state), since the charging current through the actuatur becomes zero and is diverted via the commutating coil $L_A$ and the commutating switch T2 into the capacitor C; when it becomes zero, the commutating switch T2 automatically turns off.

The commutating branch allows, on the one hand, simple voltage proportioning for the respective actuator and, on the other hand, negative charging of the capacitor C (negative bias). Negatively biasing the capacitor C ensures full discharge of the actuators.

This completes the charging procedure for the P1, and the actuator remains charged until the control signal st is terminated (st=0; FIG. 2, VIII).

In order to discharge the actuator P1, the discharging switch T41 is triggered (FIG. 2; IX). As a result, a discharging current flows from the actuatur P1 via the secondary coil $L_S$ currently working as a discharging coil, into the capacitor C. The circuit is closed from the capacitor C via the discharging switch T41 to the actuator P1.

Once the actuator P1 has been discharged ($U_P$=0 V), then the diode D takes over the current which is still flowing. If that current falls below the value of the holding current for the discharging switch T41, then the latter turns off and enters the off state; the actuator is discharged ($U_P$=0) and the drive procedure is therefore completed.

The next drive procedure for the same actuator P1, or for another actuator P2 to Pn, takes place in the same way as described for the actuator P1.

In order to carry out the method which has been described, the control circuit ST is supplied, in addition to the control signal st, with the capacitor voltage $U_C$, the actuator voltage $U_P$ and the number x=1 . . . n for the actuator Px of the fuel injection valve to be operated. With these data, and other data which have not been mentioned, for example the engine speed, the crankshaft position, the load (or accelerator pedal position) etc., the control circuit ST calculates the signals for switching the charging switch T1 on and off, or the control signals st for triggering the switch T2, the charging switch T3x arid the discharging switch T4x in the manner indicated above.

We claim:

1. A device fox driving a capacitive actuator with a first terminal and a second terminal, comprising:
   a switched mode power supply for producing a high voltage from a DC voltage source having a positive pole and a negative pole, said power supply containing a transformer with a primary coil and a secondary coil;
   an electronic switch connected in series with said primary coil of said transformer between the positive pole and the negative pole of the DC voltage source;
   a capacitor connected between a first terminal of said secondary coil of said transformer and the negative pole of the voltage source, and said secondary coil having a second terminal connected to said first terminal of said actuator;
   a charging switch connected between said second terminal of said actuator and the negative pole and conducting only in a direction towards the negative pole;
   a discharging switch connected in parallel with said charging switch, said discharging switch conducting in a direction away from the negative pole;
   a series circuit consisting of a commutating coil and a commutating switch connected between said second terminal of said secondary coil and the negative pole, said commutating switch conducting in the direction towards the negative pole; and
   a diode conducting in the direction away from the negative pole connected in parallel with said series circuit.

2. The device according to claim 1, wherein said secondary coil of said transformer is a charging coil and a discharging coil.

3. The device according to claim 1, wherein said capacitive actuator is one of a plurality of actuators each controlling a fuel injection valve of an internal combustion engine.

4. The device according to claim 1, wherein said capacitive actuator is one of a plurality of actuators connected in parallel to said second terminal of said secondary coil.

5. The device according to claim 1, wherein said charging switch is a PMOS transistor.

6. The device according to claim 1, which further comprises a control circuit for driving the capacitive actuator in accordance with signals received thereby, said control circuit being connected to and driving said electronic switch, said charging switch, said discharging switch, and said commutating switch.

7. A method of operating the device according to claim 6, which comprises:
   driving the electronic switch, the commutating switch, the charging switch, and the discharging switch with the control circuit in dependence on control signals, on a voltage of the capacitor, and on an actuator voltage, and thereby:
      charging the capacitor by switching the electronic switch until a capacitor voltage of the capacitor reaches a predetermined setpoint value;
      feeding a control signal to the control circuit for driving the actuator, whereupon the control circut triggers the charging switch for charging the actuator from the capacitor via the secondary coil, until an actuator voltage has reached a predetermined setpoint value;
   triggering the commutating switch when the setpoint value has been reached, for turning the charging switch off, whereby the actuator remains charged and the capacitor is negatively biased, whereupon the commutating switch is turned off; and
   discharging the actuator at an end of the control signal by triggering the discharging switch, and discharging the actuator via the secondary coil into the capacitor.

8. The method according to claim 7, wherein the actuator is one of a plurality of actuators each assigned a charging switch and a discharging switch, and wherein the driving step comprises operating the control circuit in dependence on a number of the actuator to be driven.

* * * * *